(No Model.)

T. H. HOLMES.
PISTON ROD PACKING.

No. 534,104. Patented Feb. 12, 1895.

Witnesses:
F. D. Goodwin
Frank E. Bechtold

Inventor:
Thomas H. Holmes
By his Attorneys
Howson & Howson

UNITED STATES PATENT OFFICE.

THOMAS H. HOLMES, OF WILKES-BARRÉ, PENNSYLVANIA.

PISTON-ROD PACKING.

SPECIFICATION forming part of Letters Patent No. 534,104, dated February 12, 1895.

Application filed June 6, 1894. Serial No. 513,647. (No model.)

*To all whom it may concern:*

Be it known that I, THOMAS H. HOLMES, a citizen of the United States, and a resident of Wilkes-Barré, Pennsylvania, have invented certain Improvements in Piston-Rod Packings, of which the following is a specification.

My invention relates to that class of packings for piston rods, valves and the like, in which nests of packing rings are contained in boxes on the head of the cylinder or valve box, the object of my present invention being to apply a compression spring to the segments of one or more of the rings of either nest without recessing or otherwise destroying the continuity of the outer face of either segment, whereby the spring is protected and when the spring is so applied to the inner ring a close joint is formed between the inner and outer rings to prevent the passage of steam between them.

Figure 1:
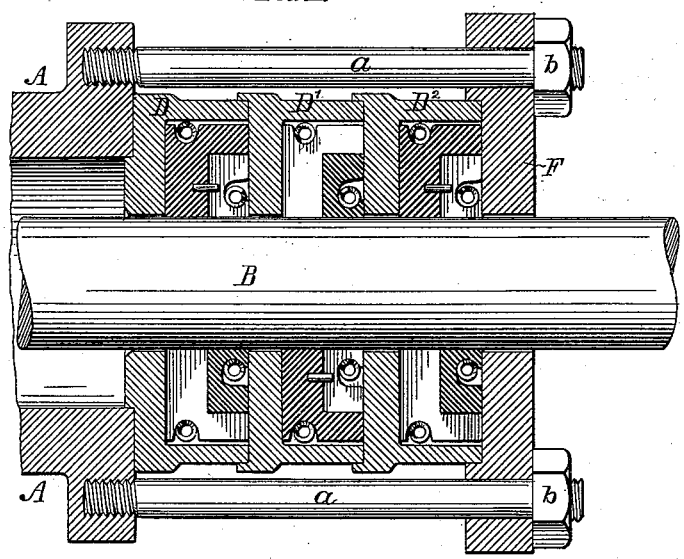
Figure 3:
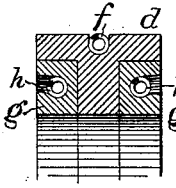
Figure 4:
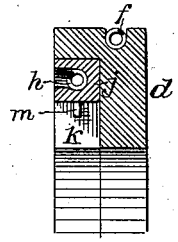
Figure 2:
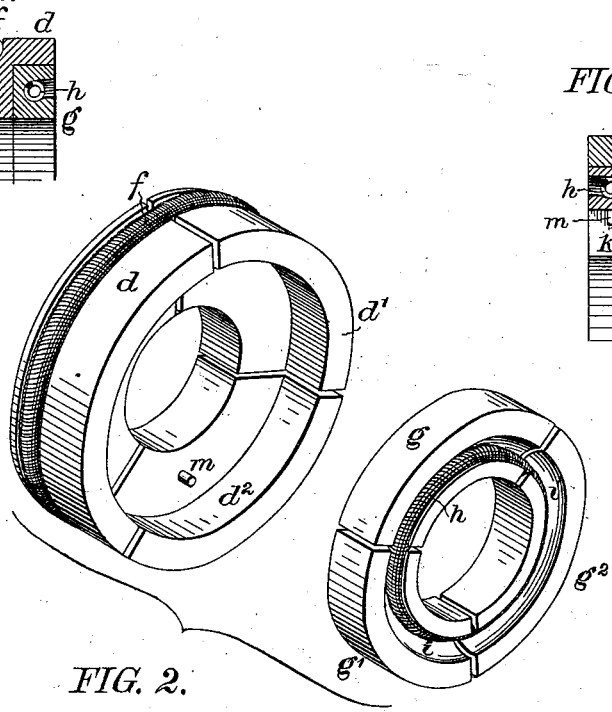

In the accompanying drawings:—Figure 1, is a sectional view of a piston rod packing embodying my invention. Fig. 2, is a perspective view of the two rings comprising each set, showing the inner ring detached from the outer ring. Fig. 3, is a sectional view showing a modified construction of the outer ring; and Fig. 4, is a sectional view illustrating a special, and in some cases, preferred construction of the inner ring.

In Fig. 1, A represents part of the usual stuffing box casing of a steam engine cylinder, and B part of the piston rod.

Mounted one upon the other beyond the casing A are three boxes D, D' and D², the inner box being seated upon the outer end of the casing A, and the outer box constituting the bearing for a cap or cover plate F, which is confined to the casing A by means of bolts $a$ and nuts $b$. Each of the boxes D, D' and D² carries a set of packing rings for bearing upon the piston rod B, and it will be evident that although I have shown three boxes and three sets of packing rings, more or less than this number can be used without departing from my invention, which relates to the construction of the packing rings and especially to the means of applying the compression spring.

The outer ring of each set comprises three segments $d$, $d'$ and $d^2$, each of L-shaped or angular cross section, each of these segments having, in its outer face, a groove for the reception of an annular coiled spring $f$, which tends to draw the segments inward so as to cause their inner faces to bear snugly upon the piston rod B.

The inner ring is composed of three segments $g$, $g'$ and $g^2$ of such shape and size as to fit within the recess formed by the L-shaped segments of the outer ring, the latter bearing snugly against, and forming a tight joint with, the outer face and one side of each segment of the inner ring, while the other side of each segment bears against the adjoining box and the inner face of each segment against the piston rod.

It is necessary that the inner segments as well as the outer ones shall be acted upon by a spring tending to draw them inward into contact with the piston rod, but in order not to break the continuity of the outer faces of the segments of the inner ring by the formation therein of recesses for the reception of the compressing spring, I adapt said compressing spring $h$ to recesses $i$ extending laterally inward from one face of each segment of said inner ring, preferably in that face of the ring which bears against the adjoining box, as shown in Fig. 1. By this means, moreover, the spring is protected while the rings are being handled or transported and is less liable to displacement or injury than an external spring would be. Hence the lateral recesses for the reception of the spring may, if desired, be used in the segments of the outer ring as well as in those of the inner ring.

In Fig. 3, I have shown a modified form of the packing in which the outer ring is composed of segments T-shaped in cross section and receives an inner ring on each side of the same, while in Fig. 4 I have shown a construction in which the two inner rings $j$ and $k$ are employed, the ring $j$ surrounding the ring $k$ and the outer ring having the lateral recess for the reception of the compression spring. The segments of each ring of the packing are held in proper relation to each other so as to break joints with the segments of the other ring or rings by means of pins $m$ entering the space between the segments of the adjoining rings. For instance as shown in Fig. 2, the segment $d^2$ has a pin $m$ projecting laterally into the space between the segments $g'$ and $g^2$ of the inner ring, and in Fig. 4, one of the segments of the outer section of the inner ring has a pin $m$ projecting radially into the space between two of the segments of the inner section of said inner ring, such construction being similar to that described and claimed in my Patent No. 500,899, dated July 4, 1893.

Having thus described my invention, I claim and desire to secure by Letters Patent—

1. The combination, in a rod packing, of an outer ring composed of segments of angular cross section, with an inner ring composed of segments fitted within those of the outer ring, a spring for compressing the segments of the outer ring against the rod, and a compression spring for the inner segments, contained within recesses extending laterally inward from one side of each of the segments of said inner ring, substantially as specified.

2. The combination of a packing ring composed of segments, each having a recess extending laterally inward from one of the side faces of the same, with an annular compression spring occupying said lateral recess, substantially as specified.

In testimony whereof I have signed my name to this specification in the presence of two subscribing witnesses.

THOMAS H. HOLMES.

Witnesses:
WILLIAM M. NICHOLSON,
J. M. RUDDY.